United States Patent
Saito

(10) Patent No.: US 6,839,676 B2
(45) Date of Patent: Jan. 4, 2005

(54) AUDIO-DECODER APPARATUS USING A COMMON CIRCUIT SUBSTRATE FOR A PLURALITY OF CHANNEL MODELS

(75) Inventor: Shouji Saito, Suita (JP)

(73) Assignee: Funai Electric Co., Ltd., Osaka (JP)

( * ) Notice: Subject to any disclaimer, the term of this patent is extended or adjusted under 35 U.S.C. 154(b) by 660 days.

(21) Appl. No.: 09/813,184

(22) Filed: Mar. 20, 2001

(65) Prior Publication Data

US 2001/0024169 A1 Sep. 27, 2001

(30) Foreign Application Priority Data

Mar. 23, 2000 (JP) .................................. JU2000-001725

(51) Int. Cl.[7] .......................... G10L 19/14; G06F 17/00
(52) U.S. Cl. .......................... 704/500; 704/201; 381/22
(58) Field of Search .................. 341/141, 61; 704/261, 704/500, 233, 206, 207, 201; 381/22

(56) References Cited

U.S. PATENT DOCUMENTS 5,321,750 A * 6/1994 Nadan .......................... 380/230
5,786,778 A * 7/1998 Adams et al. ................. 341/61
5,915,066 A * 6/1999 Katayama ..................... 386/70
6,311,014 B1 * 10/2001 Nguyen et al. .............. 386/125
2001/0024169 A1 * 9/2001 Saito ........................... 341/141

FOREIGN PATENT DOCUMENTS

| JP | 61-43887   | 9/1986  |
|----|------------|---------|
| JP | 01-311643  | 12/1989 |
| JP | 11-180221  | 7/1999  |

* cited by examiner

*Primary Examiner*—Susan McFadden
(74) *Attorney, Agent, or Firm*—Jordan and Hamburg LLP

(57) ABSTRACT

In audio-decoder apparatus, a circuit substrate common to a 2-channel model and a 5.1-channel model, on which a decoder and a D/A converter with built-in PLL are installed, and which has installing portions and for enabling installation of D/A converters without built-in PLL. The line connection modes of signal lines connecting the output terminal of the decoder to the input terminals of each D/A converter can be changed by a switching apparatus, corresponding to the channel model, thus it becomes possible to realize D/A converters without built-in PLL having better audio performance under a line connection mode desired for an improved audio performance. Therefore, a good audio performance can be secured, while a common circuit substrate can be used for a variety of channel models, which is advantageous in view of fabrication cost.

10 Claims, 5 Drawing Sheets

2ch 5.1ch

AUDIO-DECODER APPARATUS USING A COMMON CIRCUIT SUBSTRATE FOR A PLURALITY OF CHANNEL MODELS

BACKGROUND OF THE INVENTION

The present invention relates to an audio-decoder apparatus for decoding encoded audio signal, which is regenerated by a DVD player, a DVD-ROM driver or the like.

Conventionally, in a domain of audio decoder apparatus of this sort, there are a plurality of channel models (in other words, audio device sets), such as so-called "2-channel model", "5.1-channel model" and the like. And a printed circuit substrate (PCB) comprised of a decoder for decoding the Dolby audio signal and a digital/analog (hereinafter referred to D/A) converter for audio signal has been used for each of the channel models.

FIGS. 4(a) and (b) show schematic diagrams of circuit substrates 1 and 2 for 2-channel and 5.1-channel ("channel" is referred to as "ch" in Figures) models of an audio decoder apparatus in the prior art. The circuit substrate 1 for 2-channel model comprises an MPEG (Moving picture Experts Group) decoder 3 and a D/A converter (DAC) 4 having a PLL (Phase-Locked Loop) built-in for a front sound signal. On the other hand, the circuit substrate 2 for 5.1-channel model comprises an MPEG decoder 3, a D/A converter (DAC) 4 PLL built-in for the front sound signal and D/A converters 5 and 6 without built-in PLL for a surrounding sound signal and a sub-woofer center sound signal. The MPEG decoder 3 and each of the D/A converters 4, 5 and 6 are connected through lines 7. FIG. 5(a) shows constitution of a speaker system in a 2-channel model system and FIG. 5 (b) shows constitution elements of speaker system in a 5.1-channel model system.

When such a conventional scheme of the circuit substrates is employed, the fabrication cost tends to be expensive because a plurality of circuit substrates has to be fabricated. Thus, in order to solve the problem of such expensive fabrication cost, it is known that employing standardized circuit substrates and the like for different audio systems enables a common hardware to be adapted in a variety of models. (Refer to Japanese Unexamined Patent Publication No. HEI 11-180221, for instance.)

SUMMARY OF THE INVENTION

However, it cannot be so simply realized to standardize a common circuit substrate for a plurality of channel models, such as the above-mentioned 2-channel model, the 5.1-channel model and the like, because of the following reasons. That is, only one D/A converter installation satisfies the 2-channel model requirement whereas the 5.1-channel model requires a plurality of D/A converter for individually coping with a plurality of channel signal outputs. Moreover, either of the models requires at least one D/A converter that is a type with a built-in PLL for generating a clock signal. It is desirable that ones without built-in PLL (hereinafter, referred to as "D/A converters without built-in PLL") which is advantageous in view of the fabrication cost are employed for the rest of the D/A converters in the 5.1-channel model.

Another point to be considered is that the inherent audio performance of a D/A converter without built-in PLL is superior to that of a D/A converter with built-in PLL, and the final audio performance is determined mainly by the signal for the front speaker among decoder outputs. Therefore, it is desirable that the signal output terminal for the front speaker of the decoder outputs is connected to the D/A converter without built-in PLL. Under above-mentioned circumstances, certain artifice is necessary for standardize a common circuit substrate which are possible to be employed for a plurality of channel models.

The present invention has made in consideration of the aforementioned problems in the prior art, and an object of the present invention is to propose an audio-decoder apparatus which enables standardization of a common circuit substrate for a plurality of channel models while assuring the audio performance, thus which is advantageous in view of fabrication cost.

In order to attain aforementioned object, in an audio-decoder apparatus for decoding encoded audio signals according to the present invention, wherein a common circuit substrate for a plurality of channel models of an audio device comprises a decoder for decoding an audio signal and a D/A converter with built-in PLL, and further allows installing additional D/A converter(s) without built-in PLL; wherein a switching means is disposed which enables arbitrarily switching the connection mode of the signal lines, corresponding to the channel model, in signal lines connecting an output terminal of the decoder and each input terminal of the D/A converters on the circuit substrate.

In the above constitution, a common circuit substrate on which a decoder and a D/A converter with built-in PLL are installed is used for a plurality of channel models, D/A converters without built-in PLL are installed on the circuit substrate for a model using many channels, and the connection mode of signal lines connecting between the output terminal of the decoder and each input terminal of the D/A converters can be switched corresponding to the channel model. As a result, it becomes realized that D/A converter(s) without built-in PLL is comprised and a connection mode desirable to improve audio performance is assured while comprising D/A converter(s) with built-in PLL which is required at least one.

Further, in the above description, a plurality of the channel models include a 2-channel model and a 5.1-channel model, and in case of the 5.1-channel model, two D/A converters without built-in PLL are installed. Output terminals of the decoder include each terminal for front sound signal, for surround sound signal and for subwoofer center sound signal. By operating the switching means corresponding to 2-channel model or 5.1-channel model, the signal output terminal of the decoder for front sound signal is connected to the D/A converter with built-in PLL in the case of 2-channle model. In the case of 5.1-channle model, the output terminal for the front sound signal is connected to a D/A converter without built-in PLL, and yet either one of the signal output terminals of the decoder for surround sound signal or for subwoofer sound signal is connected to the D/A converter with built-in PLL and the other terminal is connected to a D/A converter without built-in PLL.

In the above constitution, it is possible to seek standardization of a common circuit substrate for the 2-channel model and the 5.1-channel model while it is possible to seek improvement of the audio characteristic since the output signal for front sound signal is converted by a D/A converter without built-in PLL.

Moreover, in the above description, by operating the switching means, the D/A converters with and without built-in PLL which are connected to the output ends of the decoder for surround sound signal and for subwoofer sound signal are made possible to be interchanged. Thus, arbitrary line connection mode is able to be selected.

PREFERRED EMBODIMENT OF THE INVENTION

Figure 1:
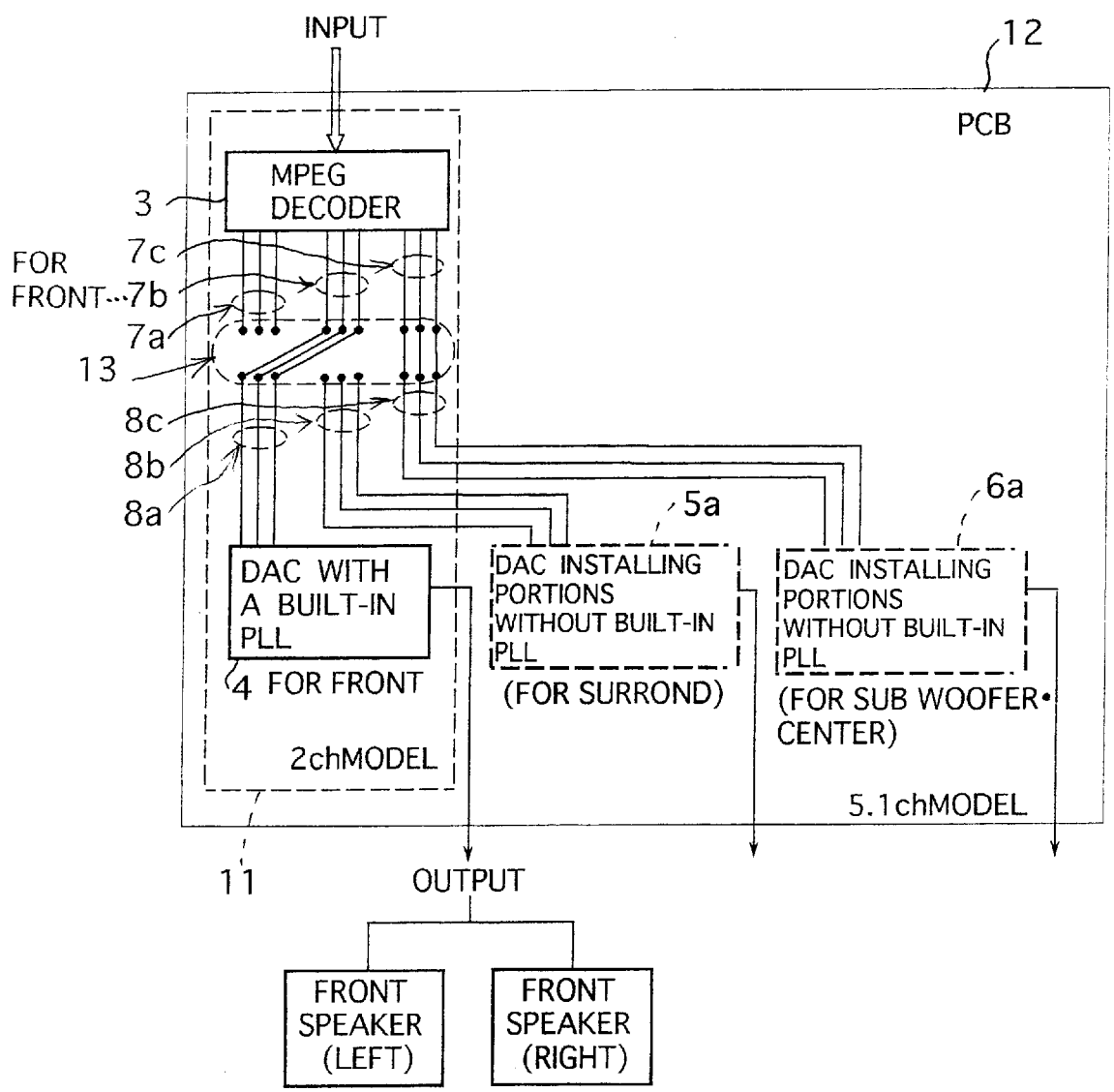
FIG. 1 is a configuration view of an audio decoder apparatus according to an embodiment of the present invention in the case of 2-channel model.
Figure 2:
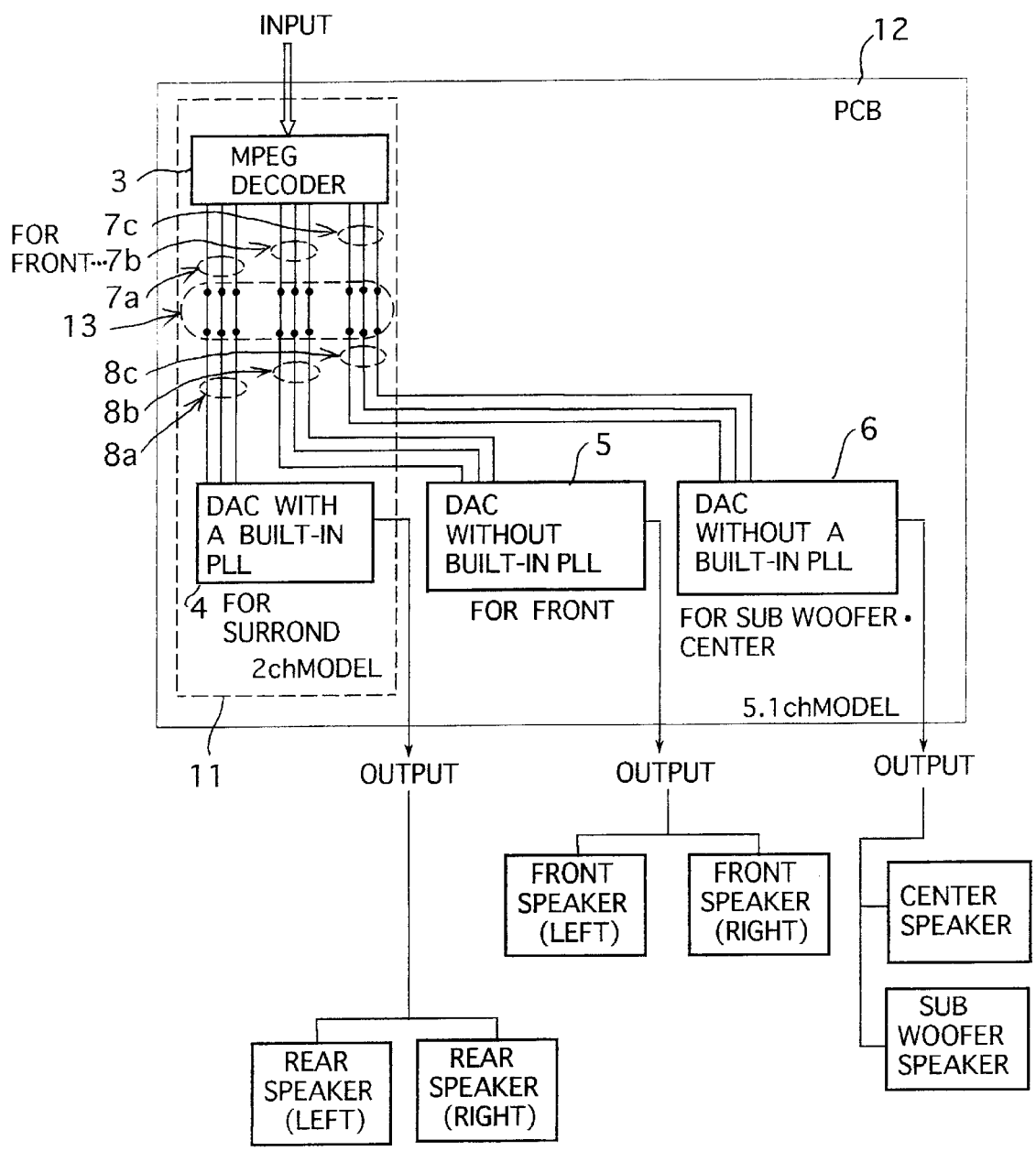
FIG. 2 is a configuration view of an audio decoder apparatus according to an embodiment of the present invention in the case of 5.1-channel model.

One embodiment of the audio-decoder apparatus according to the present invention are described below, referring to drawings. FIGS. 1 and 2 respectively show line connection modes of each of the 2-channel model and the 5.1-channel model in the audio-decoder apparatus. This audio-decoder apparatus is applied to a DVD (digital videodisc) player and the like, decodes the digital audio signal which is stored in a DVD and the like and is compress-encoded, and converts it to an analog signal. The present audio-decoder apparatus comprises of an MPEG decoder 3 for decoding audio signal and a D/A converter (digital/analog converter) 4 with built-in PLL (hereinafter referred to as "DAC") on a printed circuit substrate (PCB) 12 common to a plurality of channel models of an audio device, and further, installing portions 5a and 6a which enables to install D/A converters without built-in PLL are established. On these prepared installing portions 5a and 6a, no D/A converter is installed for the 2-channel model (FIG. 1 showing the 2-channel model indicates the installing portions by broken line rectangles), while D/A converters 5 and 6 without built-in PLL are installed on them for the 5.1-channle model (FIG. 2 showing the 5.1 channel model indicates the installing portions by bold line rectangles). The broken line framed area 11 in the circuit substrate is a portion which is used in the 2-channel model.

In the 2-channel model of an audio device, right and left front speakers are connected (for front sounds), while in the 5.1-channel model, right and left speakers (for front sounds), right and left rear speakers (for surround sounds), a center speaker (for center sound) and a subwoofer speaker (for subwoofer sound) are connected. Also, a regenerated signal of a video and/or audio signal which is encoded and compressed in a predetermined format stored in DVD and the like is inputted to the MPEG decoder 3, and the MPEG decoder 3 decompresses and decodes the signal. The MPEG decoder 3 and each D/A converters 4, 5 and 6 are constituted of IC chips.

A switch apparatus 13 (switching means) which enables to arbitrarily switch line connection modes corresponding to the channel models is disposed between each digital signal lines 7a, 7b and 7c and 8a, 8b and 8c which connect the output ends of the MPEG decoder 3 to the input ends of each D/A converters. Examples of such switch 13 can be chip resistor or jumper lines inserted between the lines. By the way, even changing line connection modes among a plurality of lines can be easily carried out if the circuit substrate 12 has a multi layer substrate. In this description, the center line 7b among the digital signal lines 7a, 7b and 7c of the MPEG decoder 3 is supposed to be the output signal for the front sound signal, and the lines on the both sides are supposed to be the output signals for the surround sound and the subwoofer center sound.

Figure 3:
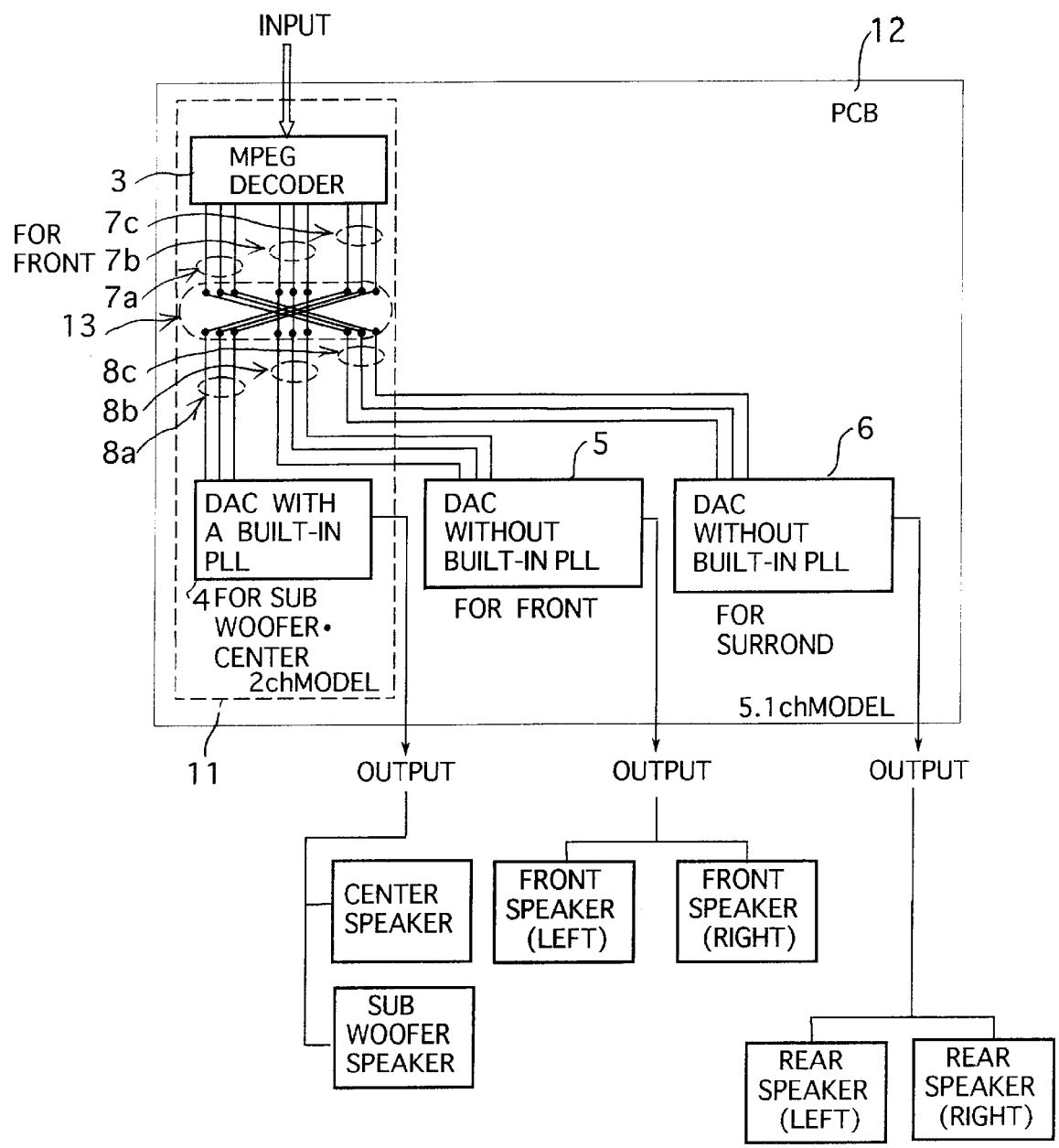
FIG. 3 is a configuration view of a decoder apparatus under a line connection mode different from that of FIG. 2.
Figure 4A:
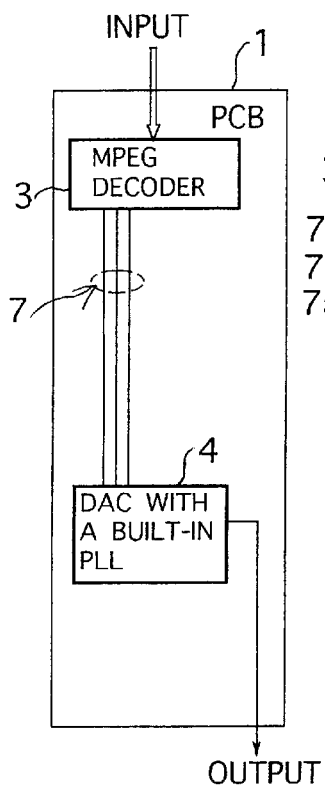
FIG. 4(a) is a constitution view of 2-channel model of an audio decoder apparatus in the prior art.
Figure 4B:
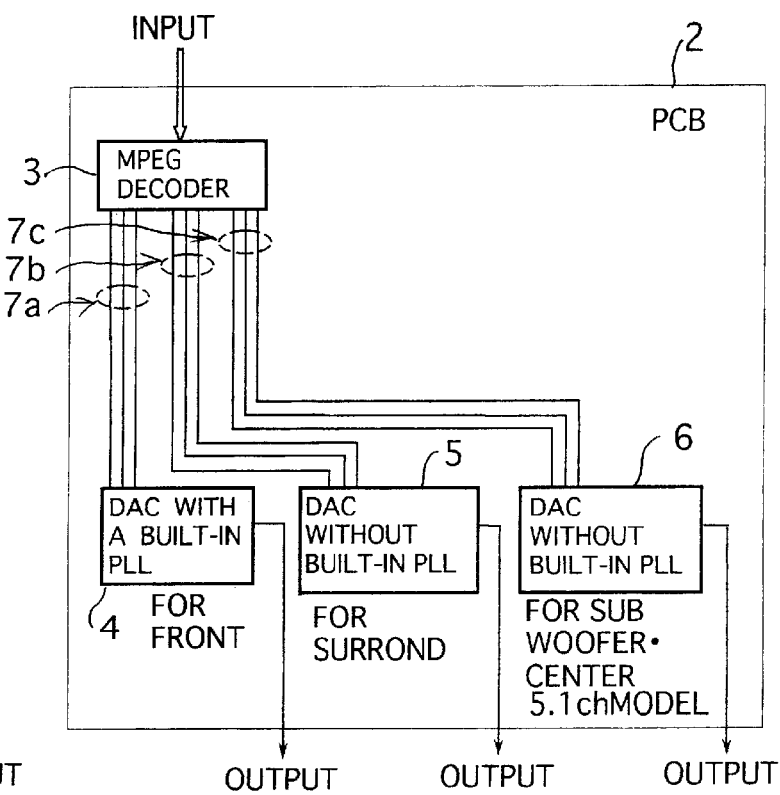
FIG. 4(b) is a constitution view of 4-channel model of the same.
Figure 5A:
FIG. 5(a) is a diagram showing speaker constitution elements of a 2-channel model audio system.
Figure 5B:
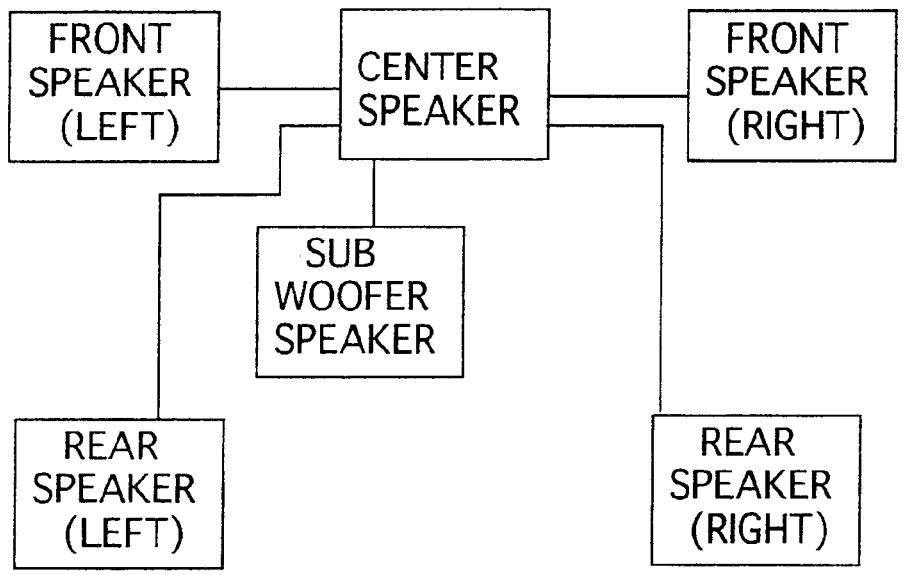
FIG. 5(b) is a diagram showing speaker constitution elements of a 5.1-channel model audio system.

As explained, in the 2-channel model (FIG. 1), the front sound signal lines 7b of the MPEG decoder 3 are to be connected to the lines 8a of the D/A converter 4 with built-in PLL (this is for the front sound) by switching the switch apparatus 13. Also, in the 5.1-channel model (FIG. 2), the front sound signal lines 7b of the MPEG decoder 3 are to be connected to the lines 8b of the D/A converter 5 without built-in PLL (this becomes for the front sound) by the switch apparatus 13. Further, the surround sound signal lines 7a are to be connected to the lines 8a of the D/A converter 4 with built-in PLL, and the subwoofer center sound signal lines 7c are to be connected to the lines 8c of a D/A converter 6 without built-in PLL. Moreover, the lines 7a for the surround sound signal and the lines 7c for the subwoofer center sound signal are supposed to be able to arbitrarily select the line connection mode against the lines 8a and 8c by means of switching the switch apparatus 13, and the above-mentioned condition shown in FIG. 2 can be connected in the relation where each of them are exchanged to each other. An exchanged configuration is shown in FIG. 3.

In the present invention, because the line connection mode has made changeable corresponding to whether it is in the 2-channel model or 5.1-channel model, standardization of the circuit substrate 12 for a plurality of channel models is realized, and furthermore a D/A converter 4 with built-in PLL required at least one is installed, while a D/A converter 5 without built-in PLL having a better audio performance is used for converting the signal output for front sound signal by means of changing the line connection mode in the 5.1-channel model, and thus, the audio performance of the apparatus can be improved compared to the configuration in the prior art. Of course, in the 2-channel model, unnecessary D/A converters 5 and 6 without PLL are not disposed on the circuit substrate.

The present invention is not limited to the above described embodiments, but many modifications and changes are possible. For example, although D/A converter 4 with built-in PLL is employed in order to generate a clock signal necessary for a signal treatment in a DVD player in the above described embodiment, it is not limited to PPL but an arbitrary D/A converter having a clock signal generate function can be employed. Similarly, although an MPEG decoder is exemplified as a decoder in the above described embodiment, it is not limited to such a decoder.

What is claimed is:

1. An audio-decoder apparatus for decoding encoded audio signals, comprising:

a circuit substrate, for use in one of a 2-channel model audio device and a 5.1-channel model audio device, said circuit substrate having a first portion common to use in both said 2-channel model audio device and said 5.1 channel model audio device, and a second portion, only in said 5.1-channel model audio device, for use together with said first portion, said first portion of said circuit substrate comprising:

a decoder, for decoding an audio signal input to said decoder, said decoder having a plurality of output terminals, each said output terminal comprising at least one signal line, and one selected from the group consisting of:

at least one digital-to-analog (D/A) converter with a built-in phase-locked-loop (PLL), and at least one a D/A converter having a clock signal generation function, capable of being connected to said decoder over at least one signal line, and at least one connection for at least one D/A converter without a built-in PLL, each said at least one connection comprising at least one signal line to an input terminal of said D/A converter without a built-in PLL, such that said at least one signal line is capable of being connected to said decoder; and a switching means, for enabling arbitrary switching of a connection mode over said respective signal lines, for a preselected, fixed one of said 2-channel model audio device and said 5.1-channel model audio device, between one of said output terminals of said decoder, and a said input terminal of one of said D/A converters of said circuit substrate.

2. The audio-decoder apparatus according to claim 1, wherein said switching means is one of a chip resistor and at least one jumper line, which is inserted between signal lines from said output terminal of said decoder and signal lines to said input terminals of said D/A converters.

3. The audio-decoder apparatus according to claim 1, wherein one of a digital video disk (DVD) player and a digital video disk-read only memory (DVD-ROM) driver is connected thereto, and said decoder is an MPEG decoder.

4. An audio device using said audio-decoder apparatus according to claim 1.

5. The audio-decoder apparatus according to claim 1, wherein said circuit substrate has a multi-layer structure.

6. An audio-decoder apparatus for decoding encoded audio signals, comprising:

a circuit substrate, for use in one of a 2-channel and a 5.1-channel model audio device said circuit having a first portion common to use in both said 2-channel model audio device, and said 5.1-channel model audio device, and a second portion, only in said 5.1-channel model audio device, for use together with said first portion, said first portion of said circuit substrate comprising:

a decoder, for decoding an audio signal input to said decoder, said decoder having a plurality of output terminals, each said output terminal comprising at least one signal line, and one selected from the group consisting of:
at least one digital-to-analog (D/A) converter with a built-in phase-locked-loop (PLL), and
at least one a D/A converter having a clock signal generation function, capable of being connected to said decoder over at least one signal line, and at least one connection for at least one D/A without a built-in PLL, each said at least one connection comprising at least one signal line to an input terminal to said D/A converter without a built-in PLL, such that said at least one signal line is capable of being connected to said decoder; and a switching means, for enabling arbitrary switching of a connection mode over said respective signal lines, for a preselected, fixed one of said 2-channel model audio device and said 5.1-channel model audio device, between one of said output terminals of said decoder, and a said input terminal of one of said D/A converters of said circuit substrate; and such that when said audio-decoder apparatus is used in said 2-channel model audio device, there are no D/A converters without built-in PLL and when said audio-decoder apparatus is used in said 5.1 channel model audio device, there are two D/A converters without built-in PLL; and wherein:

said output terminals of said decoder include a terminal for each of: a front sound signal a surround sound signal, and a subwoofer center sound signal; and actuation of said switching means causes said output terminal of said decoder for said front sound signal to be alternatively connected to the selected one of said D/A converter with a built-in PLL and said D/A converter having a clock signal generation function, when said audio-decoder apparatus is used in said 2-channel model audio device, and said output terminal of said decoder for the said front sound signal is connected to said D/A converter without a built-in PLL, when said audio-decoder apparatus is used in said 5.1-channel model audio device, and one of said output terminals of said decoder for said surround sound signal and for said subwoofer sound signal is connected to said D/A converter with a built-in PLL, and the other of said output terminals is connected to a D/A converter without a built-in PLL.

7. The audio-decoder apparatus according to claim 6, wherein said switching means is one of a chip resistor and at least one jumper line, which is inserted between signal lines from said output terminal of said decoder and signal lines to said input terminals of said D/A converters.

8. The audio-decoder apparatus according to claim 6, wherein one of a digital video disk (DVD) player and a digital video disk-read only memory (DVD-ROM) driver is connected thereto, and said decoder is an MPEG decoder.

9. The audio-decoder apparatus according to claim 6, wherein actuation of said switching means enables interchange of said D/A converters with and without built-in PLL, which are connected to output ends of said decoder, for surround sound signal and for subwoofer sound signal.

10. The audio-decoder apparatus according to claim 6, wherein said circuit substrate has a multi-layer structure.

* * * * *